US010783729B2

(12) United States Patent
Chelnik

(10) Patent No.: US 10,783,729 B2
(45) Date of Patent: Sep. 22, 2020

(54) VEHICLE PARKING AUTHORIZATION ASSURANCE SYSTEM

(71) Applicant: Marc Chelnik, Woodstock, NY (US)

(72) Inventor: Marc Chelnik, Woodstock, NY (US)

( * ) Notice: Subject to any disclaimer, the term of this patent is extended or adjusted under 35 U.S.C. 154(b) by 48 days.

(21) Appl. No.: 16/157,378

(22) Filed: Oct. 11, 2018

(65) Prior Publication Data

US 2019/0108700 A1    Apr. 11, 2019

Related U.S. Application Data

(60) Provisional application No. 62/570,927, filed on Oct. 11, 2017.

(51) Int. Cl.
| G07C 9/28 | (2020.01) |
| G06Q 30/02 | (2012.01) |
| G07B 15/02 | (2011.01) |
| G07C 9/27 | (2020.01) |
| G06F 16/22 | (2019.01) |

(52) U.S. Cl.
CPC .............. *G07C 9/28* (2020.01); *G06F 16/22* (2019.01); *G06Q 30/0284* (2013.01); *G07B 15/02* (2013.01); *G07C 9/27* (2020.01)

(58) Field of Classification Search
None
See application file for complete search history.

(56) References Cited

U.S. PATENT DOCUMENTS

| 3,918,028 A | 11/1975 | Humphrey et al. |
| 4,282,425 A | 8/1981 | Chadima, Jr. et al. |
| 4,501,958 A | 2/1985 | Glize et al. |
| 4,621,189 A | 11/1986 | Kumar et al. |
| 4,947,353 A | 8/1990 | Quinlan, Jr. |
| 4,982,070 A | 1/1991 | Bezin et al. |
| 4,990,757 A | 2/1991 | Edwards et al. |
| 5,091,727 A | 2/1992 | Mahmood |
| 5,142,131 A | 8/1992 | Collins, Jr. et al. |
| 5,278,395 A | 1/1994 | Benezet |
| 5,339,000 A | 8/1994 | Bashan et al. |
| 5,396,233 A | 3/1995 | Hofmann |
| 5,484,991 A | 1/1996 | Sherman et al. |
| 5,541,398 A | 7/1996 | Hanson |
| 5,751,973 A | 5/1998 | Hassett |

(Continued)

FOREIGN PATENT DOCUMENTS

WO    9320539 A1    10/1993

*Primary Examiner* — Daniell L Negron
(74) *Attorney, Agent, or Firm* — Zeller IP Group, PLLC; Kyle M. Zeller

(57) ABSTRACT

Methods, systems and apparatuses, including computer programs encoded on computer storage media, are provided for managing a parking facility. A host processor associated with a parking facility may receive identification information relating to a vehicle entering, exiting and/or parked in the parking facility. The host processor may determine an account associated with the vehicle, based on the identification information and on account information associated with the account. The host processor may determine that the vehicle is authorized to park in the parking facility, based on the account information. And host processor transmits permission information to a user device to thereby allow the vehicle to enter, exit and/or remain parked in the parking facility.

19 Claims, 12 Drawing Sheets

(56) References Cited

U.S. PATENT DOCUMENTS

| | | | |
|---|---|---|---|
| 5,839,085 A | 11/1998 | Yoshikawa et al. | |
| 5,905,247 A | 5/1999 | Ilen | |
| 5,940,481 A | 8/1999 | Zeitman | |
| 5,963,129 A | 10/1999 | Warner | |
| RE37,822 E | 8/2002 | Anthonyson | |
| 6,832,206 B1* | 12/2004 | Chelnik | G07B 15/02 235/31 R |
| 2003/0128136 A1* | 7/2003 | Spier | G07B 15/04 340/932.2 |
| 2007/0090971 A1* | 4/2007 | Buschman | G06Q 30/0284 340/932.2 |
| 2009/0150306 A1* | 6/2009 | Campbell | B60R 25/00 705/500 |
| 2016/0098929 A1* | 4/2016 | Nakhjavani | G08G 1/144 340/932.2 |

* cited by examiner

Services Information

| Accounts | Vehicles | Parking Info | Services | Providers |
|---|---|---|---|---|

Parking Facility: [ Facility 1 ▼ ] — 806

Date: [ October 2 ▼ ] — 807

[ Create New ] — 890

| Date 810 | Time 815 | Service 820 | Make / Model 825 | Color 830 | Parking ID 835 | Location 840 | Operator 845 | Provider 850 | Status 855 | Notes 860 | Options 865 |
|---|---|---|---|---|---|---|---|---|---|---|---|
| 10/2 | 11pm | Pickup | Pontiac Grand Prix | Green | 001 | 1-A1 | John Smith | — | Requested | One-time | Assign |
| 10/2 | 10pm | Pickup | Jeep Grand Cher. | Black | 002 | 1-A2 | Bob A. | Marc Elliot | Scheduled | Scheduled | Edit |
| 10/2 | 10am | Full Clean | Audi S4 | Red | 003 | 1-B3 | John R. | Ryan Green | Completed | Recurring; monthly | History |
| 10/2 | 1pm | Change Tires | Tesla Model 3 | Black | 140 | 1-B4 | Peter F. | Eric Allen | In-Progress | High Priority | View Updates |
| 10/2 | 4pm | Deliver | Mercedes S55 | White | 127 | 2-D1 | Sally S. | Robert Sally | Action Required | Payment Due | Notify Operator |

Login To Your Account  900

Enter Your Account Number

| Account Number | 905 |
| Password | 910 |

Login  915

Register — 920

Forgot Your Password? — 925

FIG. 9

| 1000 | 1003 Services | Account Info 1004 | 1002 |
|---|---|---|---|
| Services | 1001 | | Add New |

| Vehicle 1010 | Facility 1020 | Time 1030 | Service 1040 | Status 1050 | Amount 1060 | Notes 1070 | Options 1080 |
|---|---|---|---|---|---|---|---|
| Black Jeep | 1 | 10/2 @ 10pm | Pickup | Scheduled | Free | Assigned | Edit Cancel |
| Black Jeep | 1 | 10/2 @ 10am | Dropoff | Completed | Free | | View |
| Green Audi | 2 | 10/1 @ 11am | Full Clean | Completed | $75 | Paid | View |

FIG. 10

Request New Service     1100

Vehicle: [Select Vehicle ▼] — 1110

Parking Facility: [Select Parking Facility ▼] — 1120

Service: [Select Service ▼] — 1130

Time: [Select Available Time ▼] — 1140

Notes: 1150

[Cancel] [Submit Request]
    1161     1162

FIG. 11

VEHICLE PARKING AUTHORIZATION ASSURANCE SYSTEM

CROSS-REFERENCE TO RELATED APPLICATIONS

The present application claims benefit of U.S. provisional patent application Ser. No. 62/570,927, titled "Parking Services Management Systems and Methods," filed Oct. 11, 2017, which is incorporated by reference herein in its entirety.

BACKGROUND

This specification relates to systems and method for managing, accounting for, and authorizing vehicles in one or more parking facilities.

Although more than ninety percent of American households own a vehicle, spaces for parking such vehicles are limited in many areas. Accordingly, many vehicle operators park their vehicles in commercial, public, private, corporate or government parking facilities. For example, an operator may park their vehicle in a commercial parking facility on a short-term/transient basis and pay an hourly or daily fee. As another example, a vehicle operator may park their vehicle on a longer-term basis and pay a fixed rate, such as a weekly, monthly or yearly rate.

Vehicle operators may also park vehicles in non-commercial and/or regulated parking facilities. Parking spaces in these facilities may be available to only vehicles owned by residents of predefined locations or employees of predefined entities or classifications. As such, these parking facilities must create and maintain records to monitor changes in authorization associated with a given operator and/or vehicle.

Commercial, non-commercial and regulated parking facilities typically maintain records of authorized vehicles and parked vehicles. One prior system employs sequential stickers and labels displayed on parked vehicles that are crossed check against printed lists. For example, an employee of a parking facility may check the parking facility on a daily basis to ensure that all parked vehicles are authorized vehicles (e.g., that an appropriate fee has been paid for each parked vehicle and/or that the vehicle meets a required criterion).

Unfortunately, this process is time consuming and subject to human error. In addition, this process fails to account for situations where an employee knowingly permits unauthorized vehicles to park in the facility, which may result in revenue loss, breaches to security and/or improper usage of allotted space.

Another prior system provides a magnetic card for managing parking payments. In this system, a card and label may be affixed to the windshield of a parked vehicle. Each time a driver parks their vehicle, they must enter information into a parking terminal for the purpose of payment. A facility employee must then examine the entered information to verify payment for a parking space. Unfortunately, this system fails to integrate with fee systems and is burdensome for long-term parking. Other prior systems also require active participation by the driver of a vehicle and fail to manage account information efficiently.

Interactive tagging and/or auditing systems also exist, where identification tags and/or other tags (i.e., license plates, etc.) can be scanned, identified and compared to a central computer. However, these systems fail to integrate modern improvements that allow for a greater ability to accurately interface with a central database. For example, such systems do not include scanning devices for both (1) identifying vehicles entering, parked in, and/or exiting a parking facility and (2) determining a location of any number of vehicles parked in a parking facility. Moreover, such systems do not employ scanners that can be utilized both when connected to a network (i.e., "online mode") and when not connected to a network (i.e., "offline mode").

Accordingly, there remains a need for a system that retrieves and processes identification information from an operator and/or a vehicle in order to ensure proper usage of one or more parking facilities. It would be beneficial if such a system could manage and coordinate parking among any number of parking facilities for a plurality of accounts that are each associated with one or more operators and one or more vehicles. It would be further beneficial if the system employed scanners to identify and locate vehicles, where such scanners may be operated in both online and offline modes. It would also be beneficial if the system was adapted to monitor traffic flow, determine the location of parked vehicles, and maintain detailed records including parking times and parking locations for any number of vehicles. It would be further beneficial if the system could receive service requests relating to any number of vehicles, schedule and track corresponding services and provide notifications regarding the same.

SUMMARY

In accordance with the foregoing objectives and others, exemplary apparatuses, systems and methods are disclosed herein to dynamically retrieve and process vehicle information in order to ensure proper usage of one or more parking facilities. Such systems may coordinate parking among any number of associated parking facilities. Moreover, such systems may be adapted to manage services provided by associated parking facilities.

In one embodiment, an apparatus and method are provided to receive, by a host processor associated with a parking facility, identification information relating to a vehicle that is entering, parked in, or exiting the parking facility. The host processor may determine an account associated with the vehicle, based on the identification information and any stored account information associated with the account. The host processor may determine that the vehicle is authorized to park in the parking facility, based on the account information. The host processor may then transmit permission information to a user device to thereby allow the vehicle to enter, remain parked in, or exit the parking facility.

In another embodiment, an apparatus and method are provided to register a vehicle with a parking facility management system by providing vehicle information and/or operator information to a server or host processor associated with one or more parking facilities. The host processor creates an account associated with the vehicle and/or the operator of the vehicle. The host processor generates a parking identification for the vehicle and/or the operator and associates the parking identification with the account. At least one input unit communicatively coupled to the host processor, retrieves vehicle information from vehicles and/or operators entering a first parking facility of the parking facilities associated with the host processor, obtains permission information for authorizing the vehicle to enter the first parking facility based on the account, and causes activation of an entry device into the first parking facility using the permission information. One or more input units in parking facilities associated with the host processor retrieve vehicle information, on a periodic basis, for vehicles parked in each parking facility associated with the host processor. The input units transmit the vehicle information to the host processor. The host processor coordinates parking between the parking facilities associated with the host processor, wherein in coordinating parking, the host processor allows for at least one of multi-location access or discounted access using one account and uses a reservation system to permit parking in an associated parking facility. The host processor processes the vehicle information to generate one or more of parking facility information, verification information and reports about each associated parking facility.

In yet another embodiment, a method is provided that includes: storing, by a host processor, in one or more databases, account information associated with each of a plurality of accounts, the account information including vehicle information relating to one or more vehicles and authorization information; receiving, by the host processor, from an input unit, identification information relating to a vehicle parked in a location associated with a parking facility; determining, by the host processor, an account associated with the vehicle from the plurality of accounts, based on the received identification information and the vehicle information associated with the determined account; determining, by the host processor, that the vehicle is authorized to park in the parking facility, based on the authorization information associated with the determined account; and transmitting, by the host processor, permission information to a user device to thereby indicate that the vehicle is authorized to park in the location.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8 shows an exemplary services information screen 800 of a service provider application in accordance with some embodiments.

FIG. 9 shows an exemplary login screen 900 of a customer application in accordance with some embodiments.

FIG. 10 shows an exemplary services list screen 1000 of a customer application in accordance with some embodiments.

FIG. 11 shows an exemplary service request screen 1100 of a customer application in accordance with some embodiments.

DETAILED DESCRIPTION

Figure 1:
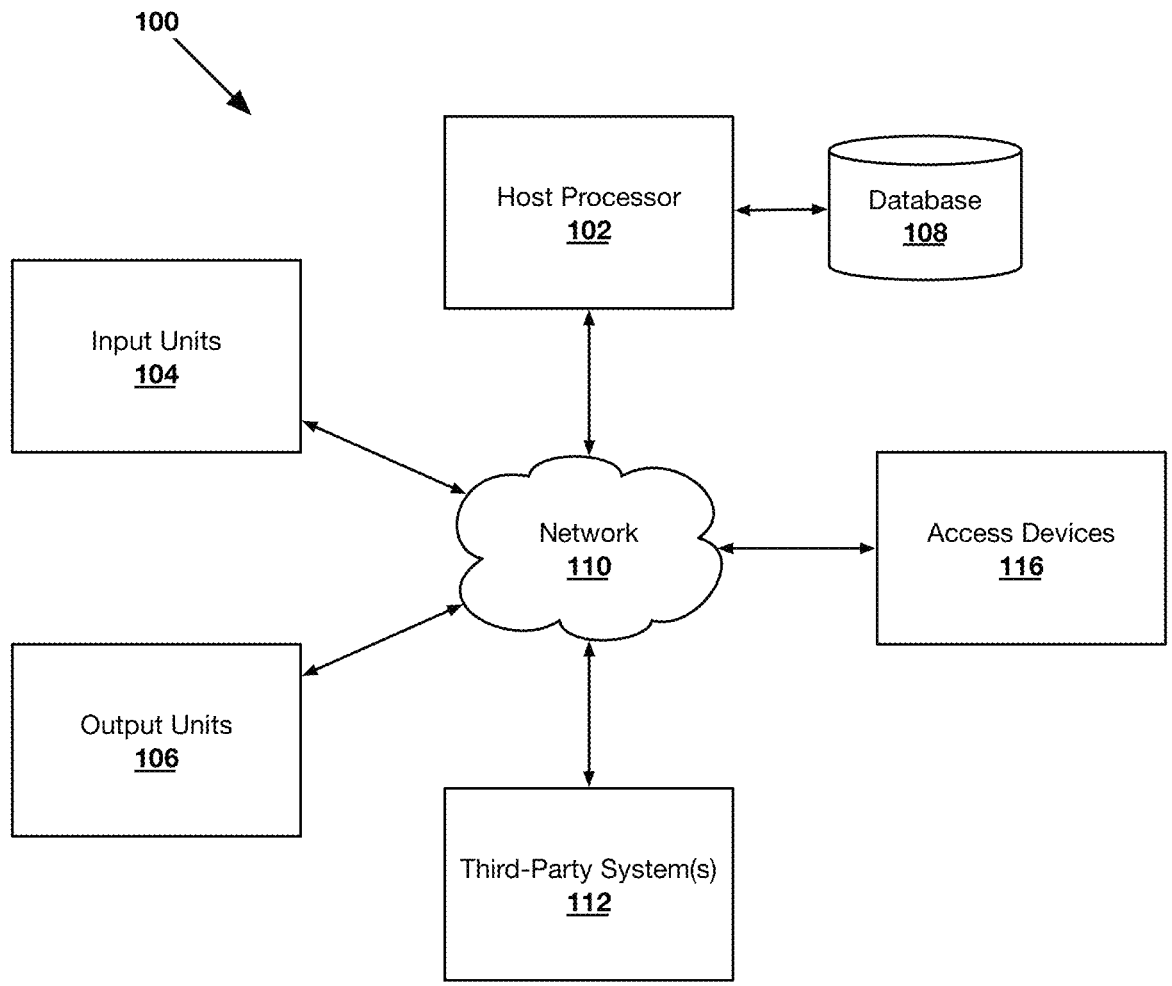
FIG. 1 shows an exemplary parking facility management system 100 used in accordance with some embodiments.

Various methods and systems are disclosed to enable dynamic coordination of parking vehicles in parking spaces associated with one or more parking facilities. An exemplary parking facility management system described herein may dynamically retrieve identification information relating to vehicles that are entering, exiting and/or parked in one or more parking facilities associated with the parking facility management system. Unlike conventional parking systems, the disclosed systems may maintain and update records for any number of operators and/or any number of vehicles parked in one or more associated parking facilities, and may coordinate parking among the associated parking facilities.

As used herein, the term "parking facility" includes, without limitation, any indoor or outdoor area, location or structure comprising one or more places or spaces in which one or more vehicles or other objects may be parked and/or stored. It will be appreciated that parking facilities may be commercial, non-commercial, or otherwise regulated for parking and/or storing vehicles or objects for any amount of time, for example, on a long-term basis (e.g., weekly, monthly, yearly, or any portion thereof) and/or on a short-term/transient basis (e.g., hourly, daily or any portion thereof).

Exemplary vehicles and objects may include, for example, cars, trucks, buses, motorcycles, bicycles, trains, trams, ships, boats, aircrafts, spacecrafts, containers, and/or other mobile machines and/or storage apparatuses that may be used to transport people and/or cargo. For the sake of simplicity, vehicles and objects that may be parked in a parking facility are collectively referred to herein as "vehicles." Moreover, vehicles that are parked in a parking facility are referred to herein as "parked vehicles" and vehicles that are authorized to park in a parking facility (discussed in detail below) are referred to herein as "authorized vehicles."

The described embodiments may additionally or alternatively be employed to manage services relating to one or more vehicles located in one or more parking facilities. Exemplary parking facility services may include, but are not limited to, parking services (e.g., parking spot reservations, transportation to/from a parked vehicle, vehicle drop off and/or retrieval, etc.); discounting and provisioning services; third-party access to available spaces; cleaning services (e.g., interior and/or exterior vehicle washing); and/or maintenance services (e.g., oil change, tire repair or replacement, windshield repair or replacement, engine repair or tuning, bodywork, etc.). Although exemplary embodiments are primarily discussed herein with respect to parking facility services, it will be appreciated that the embodiments are not limited to such services. Indeed, the described methods, systems, apparatuses and software applications may be employed to manage other types of services where people and/or equipment must be procured to a location at a specific time (e.g., medical services, sales and support services and/or operational services).

Parking Facility Management System

Referring to FIG. 1, an exemplary parking facility management system 100 according to an embodiment is illustrated. The parking facility management system 100 may include a host processor or server 102, which may be physically located at parking facility or at a location outside of the parking facility.

As shown, a database 108 may be accessed by the host processor 102 such that the host processor 102 may transmit information to and/or receive information from the database 108. It will be appreciated that the database may be internal to the host processor 102 or may be accessed by the host processor over a network 110 (e.g., Internet, local area network ("LAN"), wide area network ("WAN"), cellular network, intranet, etc.) or via another wired or wireless connection.

Generally, the database 108 may be adapted to store parking facility information for any number of parking facilities associated with the system. Such parking facility information may include, but is not limited to: operating hours, parking space information, a count of parked vehicles at a given time or within a given period, a parking ID for each parked vehicle at a given time or within a given period, and/or location information relating each parked vehicle (e.g., at a given time or within a given period). As discussed below, the parking facility information may also include, or otherwise be associated with, service information (e.g., service types, service status, scheduled services, pricing information, service provider information, etc.) and/or account information corresponding to authorized vehicles and/or parked vehicles.

The database 108 may be further adapted to store account information for any number of accounts associated with the parking facility management system 100. Exemplary account information may include, but is not limited to, a unique account ID, vehicle information for one or more vehicles, operator information for one or more operators of such vehicles, payment information, parking information and/or authorization information (each discussed in detail below). As such, a single account may be associated with one or more vehicles and one or more operators.

It will be appreciated that any or all of the above described information may be manually entered into the system by a user, such as a vehicle operator, a service provider and/or an admin user. Additionally or alternatively, such information may be automatically determined by the system, for example, based on information received from a user and/or one or more connected devices/systems.

As shown in FIG. 1, the system 100 comprises any number of input units 104 and/or output units 106 that may interact with the host processor 102 via a network 110. Generally, input units 104 may be attached to various locations within a parking facility (e.g., entrance, exit, walls, columns, ceilings, parking spaces, etc.); carried by service providers throughout a parking facility; and/or attached to (or otherwise included in) autonomous and/or remote-controlled vehicles that may move throughout a parking facility.

Input units 104 may generally comprise electronic devices (e.g., general purpose computers, desktops, laptops, mobile phones, wearable devices, drones, autonomous vehicles, etc.) that are adapted to receive and/or determine: (1) identification information relating to one or more vehicles/operators entering, exiting and/or parked in a given parking facility (e.g., a parking ID, vehicle information, and/or operator information); (2) payment information relating to payments for parking (e.g., payment method, credit card number, amount paid, expiration date, and/or billing information); and/or (3) location information relating to locations in which vehicles are parked in a parking facility (e.g., a parking space ID of a specific parking spot where a vehicle is parked or a geolocation of the vehicle). To that end, input units 104 may comprise one or more readers/scanners/sensors/inputs, such as: keyboards, touchscreens, pointing devices, cameras, video recorders, radio frequency ID ("RFID") receivers, near field communication ("NFC") receivers, Bluetooth receivers, Bluetooth Low Energy ("BLE") receivers, GPS sensors, Wi-Fi transceivers, cellular transceivers (CDMA, GSM, LTE, etc.) and/or credit card scanners.

It will be appreciated that, in addition to receiving such information, the input unit(s) 104 may be adapted to transmit such information to the host processor 102, database 108 and/or to other electronic processors communicatively coupled to input units and/or host processor. Accordingly, one or more input units 104 may be physically attached to host processor 102 (e.g., via Ethernet or USB) or may be remotely located from host processor 102 and communicatively coupled thereto (e.g., via a Wi-Fi or cellular connection to network 110). Moreover, input units 104 may always be in communication with host processor 102 (i.e., "online mode") or may be disconnected from the host processor/network when in use (i.e., "offline mode") and then reconnected to the host processor/network in order to transfer information. It will also be appreciated that any number of input units 104 may be communicatively coupled to each other.

In certain embodiments, the system 100 may further comprise any number of output units 106, which are adapted to receive and/or display information transmitted from the host processor 102 and/or any input units 104. Each output unit 106 may be physically attached to host processor 102 or may be remotely located from host processor 102 and communicatively coupled thereto (e.g., via network 110). Output units 106 may also be communicatively coupled to each other and/or to input units 104. An output unit 106 may additionally or alternatively be located on the same device as an input unit 104. Accordingly, an output unit 106 may be a general-purpose computer, desktop computer, laptop computer, tablet, mobile phone, wearable device (e.g., a smartwatch), display or an electronic device attached to a reader or scanner.

As discussed in detail below, in cases where output units 106 are located in a parking facility, a service provider in the parking facility may use the information received from host processor 102 to take further action, for example, to tow or move unauthorized, parked vehicles. Additionally or alternatively, the user may use the generated information to, for example, determine to cancel an account that is delinquent and subject to collection.

In certain embodiments, the input units 104 and/or output units 106 may comprise one or more user devices capable of accessing the host processor 102 by running a client application or other software, like a web browser or web-browser-like application. The client application may be adapted to communicate with a database application running on the host processor over, for example, a network. Such configuration may allow users of client applications to input information and/or interact with the database application from any location that allows for access to the host processor.

As discussed in detail below, exemplary client applications include, but are not limited to a customer application and a service provider application. These client applications may be adapted to present various user interfaces to users based on access privileges and/or information sent by the parking facility management system and may allow users to send and receive data. Moreover, as explained below, the various client applications may allow users to create, modify and/or cancel services, as well as track the progress of such services. Each client application may comprise HTML data, images, icons, and/or executable code. The executable code may be composed in JavaScript, ECMAscript, coffeescript, python, Ruby or other programming languages suitable for execution within the client application, or translation into a client application executable form.

It will be apparent to one of ordinary skill in the art that, in certain embodiments, any of the functionality of a client device may be incorporated into the host processor, and vice versa. Likewise, any functionality of a client application may be incorporated into a browser-based client, and such embodiments are intended to be fully within the scope of this disclosure. For example, a browser-based client application could be configured for offline work by adding local storage capability, and a native application could be distributed for various native platforms via a software layer that executes the browser-based program on the native platform.

In one embodiment, communication between a client application and the host processor may involve the use of a translation and/or serialization module. A serialization module can convert an object from an in-memory representation to a serialized representation suitable for transmission via HTTP or another transport mechanism. For example, the serialization module may convert data from a native Python, Ruby, or Java in-memory representation into a JSON string for communication over the client-to-server transport protocol.

Similarly, communications of data between an input unit 104, output unit 106 and the host processor 102 may be continuous and automatic, or may be user-triggered. For example, the user may click a button, causing the client to send data to the host processor. Alternately, a client application may automatically send updates to the host processor periodically, without prompting by a user. If a client sends data autonomously, the host processor may be configured to transmit this data, either automatically or on request, to additional clients.

As shown in FIG. 1, the parking facility management system 100 may further comprise any number of additional devices and/or systems connected via the network 110 (e.g., via an API, SDK or web widget). For example, the system 100 may include one or more third-party systems 112 that may be accessed by the host processor 102, input units 104 and/or output units 106. Exemplary third-party systems 112 may include, but are not limited to: registration systems, parking systems, authorization systems, services management systems, access control systems, security and surveillance systems, financial systems (e.g., billing, invoicing, and/or accounting systems), contact management systems, customer relationship management ("CRM") systems, calendaring systems, mapping systems, communication systems and others.

The host processor 102 may communicate with connected third-party systems 112 in order to populate tables in the database 108, with or without user interaction. Moreover, the host processor may be capable of communicating user-populated and/or system-populated database table entries to third-party systems 112 and may notify users of such communications.

As an example, host processor 102 may use a driver's license number, license plate number, electronic toll number, or another identification number to access and retrieve vehicle information and/or operator information from a Department of Motor Vehicles ("DMV") system or an electronic toll company system. As another example, the host processor 102 may receive payment information from an input unit 104 or a connected third-party payment system.

As yet another example, the host processor 102 may be in communication with a third-party parking system adapted to provide discounting and/or parking provisioning (e.g., the SPOTHERO parking platform). The host processor may interface with such parking system to receive information about available parking spots, parking discounts, parking information and/or payment information. The parking facility management system 100 may store such information in the database 108 and may employ the same to create, update and/or delete parking facility information associated with one or more parking facilities and/or account information associated with one or more accounts.

As another example, the host processor 102 may be communicatively coupled to a third-party services management system, such as a reservation system or callboard system that may be employed to schedule or reserve services provided in a parking facility. Host processor 102 may be communicatively coupled to the services management system, for example, via network 110.

In one embodiment, the parking facility management system 100 may be in communication with one or more access devices 116 (e.g., openable gates, retractable spikes, movable barriers, etc.), each of which is configured to restrict vehicle access to a parking facility and/or parking space within a parking facility. Each access device 116 may be communicatively coupled to the parking facility management system 100 through a wired or wireless communications network, such as network 110.

It will be appreciated that any other suitable software, hardware or combinations thereof may be used with the exemplary parking facility management system 100 and applications disclosed herein. Moreover, such applications may be implemented at any suitable location in FIG. 1, such as but not limited to at the host processor 102, a third-party system 112, one or more input units 104, one or more output units 106, and/or at a location not shown.

Account Registration

Figure 2:
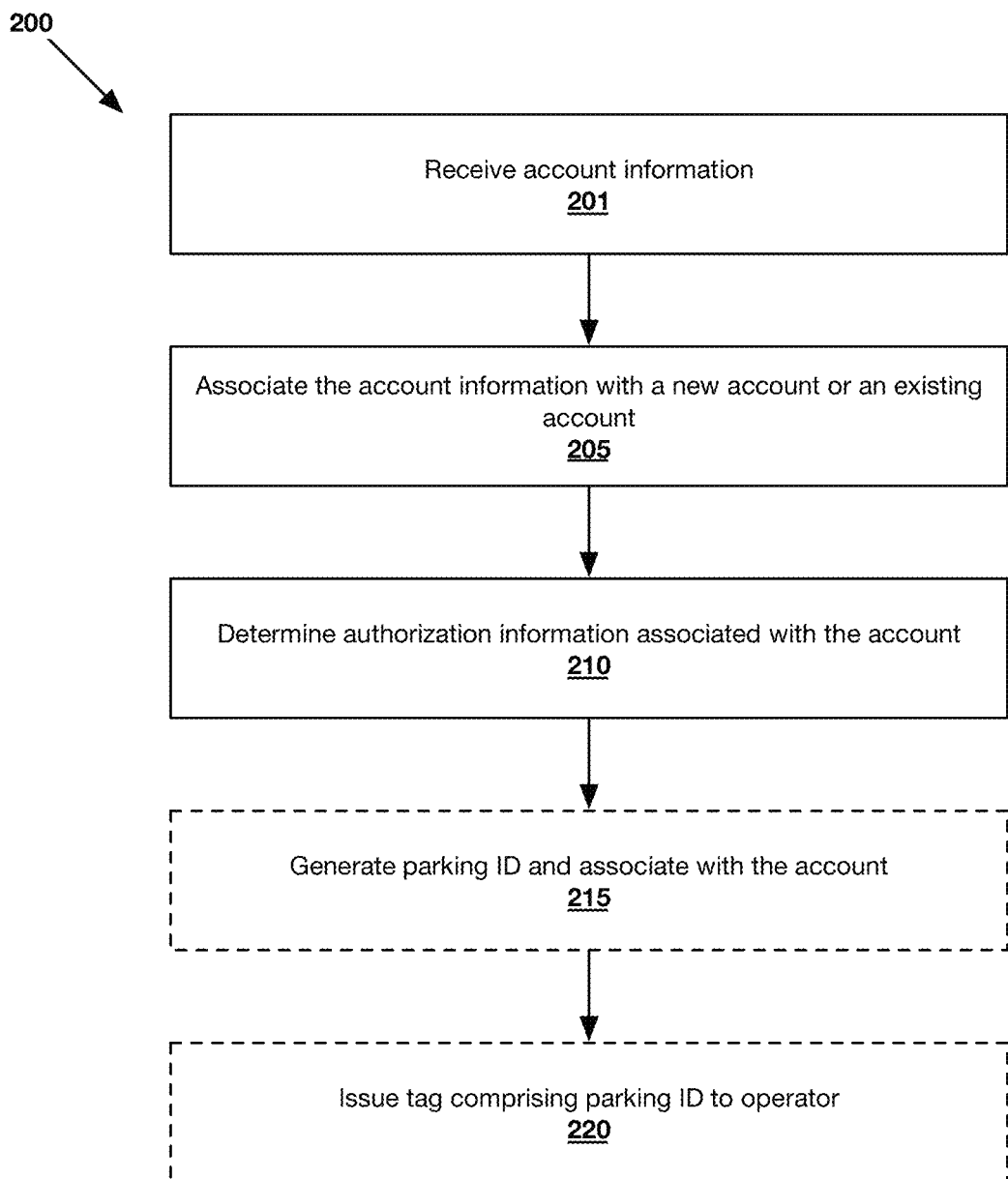
FIG. 2 shows an exemplary method 200 of registering an account in accordance with some embodiments.

Referring to FIG. 2, an exemplary account registration process 200 according to an embodiment is illustrated. At step 201 account information, such as vehicle information, operator information, payment information and/or parking information, is received and/or determined by the system.

Exemplary vehicle information may include, but is not limited to: a unique vehicle ID, a vehicle identification number (VIN), make, model, year, color, license plate number, registration number, insurance information and/or other identifying vehicle information.

Exemplary operator information may include, but is not limited to: a unique operator ID, name, billing address, residential address, employment information, phone number, email address, driver's license information, insurance information, age, gender, height, weight, eye color, finger print(s) and/or other identifying information.

Exemplary payment information may include, but is not limited to: an amount paid by an operator to park a vehicle in a parking facility for a given period, any balance owed by the operator for one or more vehicles parked in one or more parking facilities, a payment method, billing information, payment history, and/or other information relating to billing and/or payments for parking one or more vehicles in one or more parking facilities.

And exemplary parking information may include, but is not limited to: one or more parking IDs (discussed below); one or more parking facilities in which one or more operators and/or one or more vehicles associated with an account are authorized to park; a fee and/or rate to be charged for parking in such facilities; a vehicle parking status (e.g., parked, parked in a specific location, or not parked); one or more authorized parking locations in one or more parking facilities in which operator(s) and/or vehicle(s) associated with the account are authorized to park on a long-term or transient basis; and/or historical parking information for an operator and/or one or more vehicles associated with the account.

In one embodiment, some or all of the account information may be manually entered into the system by one or more users (e.g., a vehicle operator, a service provider and/or an admin user). For example, a user may input any account information into a client application and such information may be transmitted to the host processor and stored in the database.

In another embodiment, an input unit may be employed to scan, read or otherwise determine such information. For example, an input unit may scan an operator's license in order to determine operator information, such as a name, address, license number, license state, date of birth, etc. As another example, an input unit may scan an operator's credit card and/or mobile phone (e.g., via Apple Pay, Google Pay, or other mobile payment platforms) to determine payment information. As yet another example, an input unit may scan a vehicle's license plate and/or VIN barcode to determine vehicle information, such as license plate number, license plate state, VIN number, etc. And, as another example, an input unit may capture images or video of a vehicle and/or operator and image recognition functionality may be employed to determine vehicle information and/or operator information from such images/video.

At step 205, the system associates the received account information with a new account or an existing account. In one embodiment, the system may determine and store a unique account ID for each account registered with the system, a unique vehicle ID for each vehicle registered with the system and/or a unique operator ID for each operator registered with the system. The vehicle ID may be generated from any received vehicle information or may simply be sequential. The operator ID may be, for example, a password or personal identification number (PIN) and/or the operator ID may be generated from any operator information obtained from the operator. The operator ID may be assigned to an operator, associated with a corresponding account and stored in the database.

At step 210, the system may determine and/or associate authorization information with the account. Generally, authorization information relates to one or more conditions under which a particular operator and/or vehicle may be permitted to enter or exit a given parking facility and/or remain parked in a given parking space within a parking facility. To that end, authorization information may include, or otherwise be based on, payment information and/or parking information. For example, authorization information may be based on one or more of: employment information, residence information, an amount paid, an amount due, one or more authorized operators, one or more authorized vehicles, a vehicle parking status relating to one or more of such vehicles (e.g., parked, parked in a specific location, or not parked), one or more authorized parking facilities, and/or one or more authorized parking spaces associated with such authorized parking facilities.

At optional steps 215 and 220, a parking ID may be generated for each vehicle registered with the system and a parking tag comprising the parking ID may be issued to corresponding operators. It will be appreciated that any of the vehicle ID, operator ID and account ID may be individually or collectively used as, or used to generate, a parking identification ("parking ID") and each may generally be referred to herein as a parking ID. The parking ID may be associated with a corresponding account and stored in the database.

In one embodiment, the parking ID may be displayed on, stored in, or otherwise embodied in, a physical apparatus (e.g., a tag, label, decal, sticker, permit, card, etc.) or digital software (e.g., a client application) (collectively referred to herein as a "parking tag"). Exemplary parking tags may employ various means of storing and/or transmitting the parking ID to the system, for example, via a RFID device, a NFC device, a Bluetooth or BLE device, a Wi-Fi device, a barcode or QR code, a digital display, a physical display, an electronic toll collection device, a magnetic strip and/or other machine or human readable means. Moreover, in some embodiments, such parking tags may include a dedicated display and/or a power source, such as one or more rechargeable or disposable batteries.

It will be appreciated that a single account may be associated with any number of vehicles and, accordingly, each account may be associated with any number of parking IDs. Moreover, each account may comprise parking information pertaining to the number of vehicles that may be parked in any number of parking facilities at a given time. In this way, the system may prevent one or more operators associated with a single account from parking more than an allowed number of vehicles in a single parking facility and/or in multiple parking facilities at the same time.

Although not shown, in one embodiment, the method 200 may comprise an optional pre-authorization process. In this embodiment, the system may send an invitation that includes registration information to a potential user. Such registration information may comprise, for example, a one-time-use code or the like. Upon receiving an invitation, the recipient may register with the system by, for example, providing the received registration information to the system (e.g., via a client application). The method may then continue to steps 201 and 205, where the user provides additional account information and the system associates the account information with a new account or an existing account.

Managing Vehicles Entering/Exiting a Parking Facility

Figure 3:
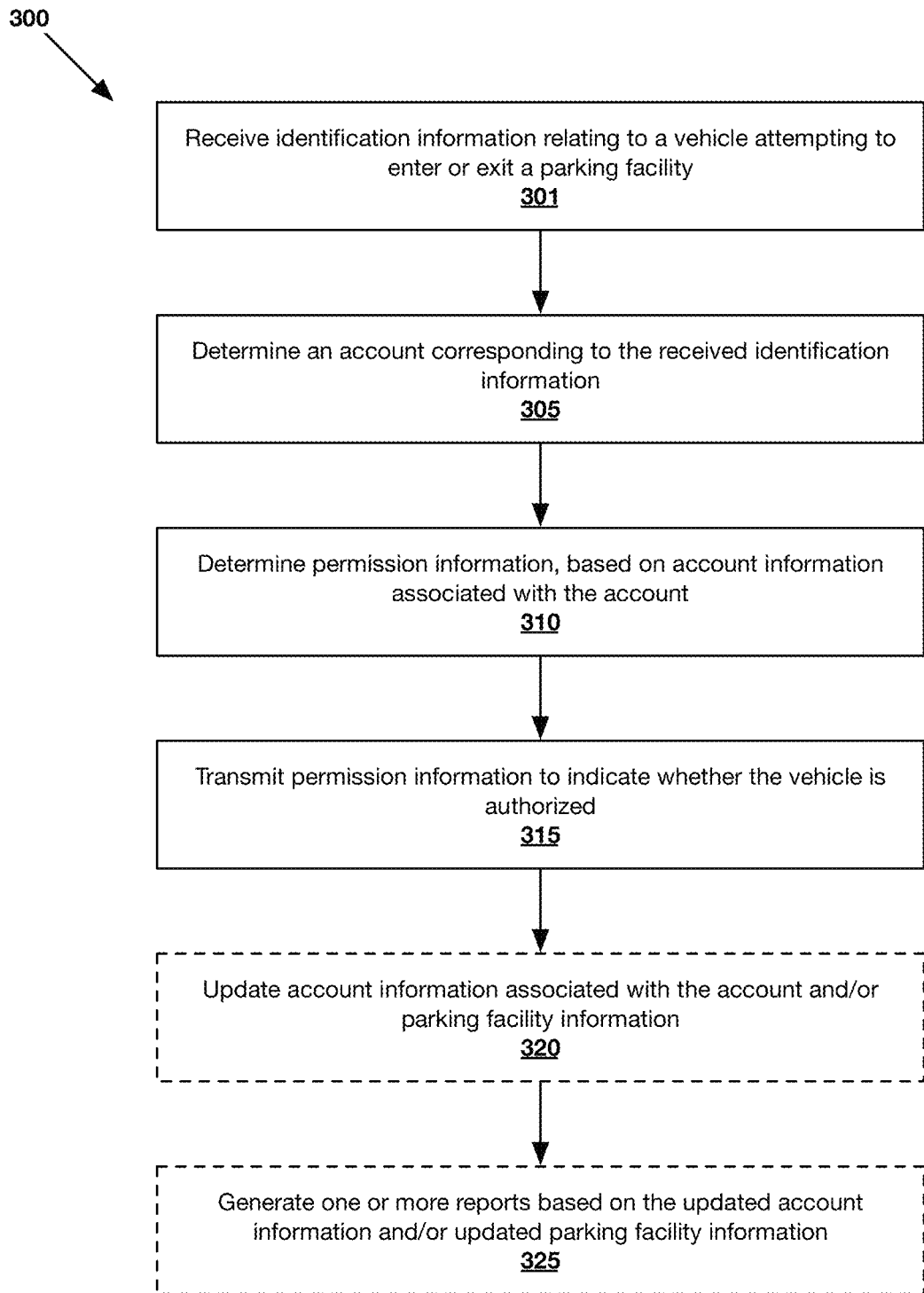
FIG. 3 shows an exemplary method 300 of permitting vehicles to enter and/or exit a parking facility in accordance with some embodiments.

Referring to FIG. 3, an exemplary method 300 of permitting vehicles to enter and/or exit a parking facility is illustrated. As shown, the method begins at step 301, where identification information relating to a vehicle attempting to exit/enter a parking facility is received.

In one embodiment, some or all of the identification information may be manually entered into the system by one or more users (e.g., an operator, admin user and/or service provider). For example, a user may input an account ID, parking ID, any vehicle information (e.g., vehicle ID, VIN, or license plate number) and/or any operator information (e.g., operator ID or name) into a client application and such information may be transmitted to the host processor.

In another embodiment, one or more input units may be configured to retrieve identification information for each vehicle/operator entering/exiting the parking facility. As an example, an input unit may be fixed to an entrance/exit of the parking facility to retrieve a parking ID from parking tags associated with entering/exiting vehicles. The parking ID may be read using, for example, an RFID receiver or Bluetooth receiver.

As another example, an input unit may be operated by a service provider associated with a parking facility to scan an operator's parking tag, license, license plate, VIN number, or other source of identification information. And, as another example, an input unit may capture images or video of a vehicle and/or operator and image recognition functionality may be employed to determine identification information from such images/video.

At step 305, the system determines an account associated with the vehicle/operator, based on the identification information and on account information associated with the account. For example, the system may compare a received parking ID to parking IDs stored in the system. Upon locating a matching parking ID, the system may determine that the account associated with the matching parking ID corresponds to the account associated with the vehicle/operator.

At step 310, the system may receive, determine and/or generate permission information relating to whether the vehicle/operator is authorized to enter/exit the parking facility. In one embodiment, the system determines that the vehicle is authorized to park in the parking facility based on any account information associated with the matching account (e.g., authorization information). For example, the system may determine that the account is current (i.e., fully paid up) and/or that the operator associated with the account matches one or more required authorization criteria (e.g., based on employment information and/or residence information). As another example, the system may determine that the specific vehicle is authorized to park in the parking facility where the identification information is received and/or at the time the identification information is received.

In an alternative embodiment, the system may simply receive authorization information from a connected third-party parking system, rather than determining such information. In such embodiment, the parking facility management system may transmit account information (e.g., an account ID) to the third-party parking system and then receive the authorization information from such system.

Upon determining permission information, such information may be transmitted to one or more devices and/or systems to thereby allow the vehicle to enter or exit the parking facility 315. In one embodiment, the system may display or otherwise transmit the permission information to an input unit or output unit (e.g., in the form of an authorization table that may be displayed via an iFrame or other means). A user of the input/output unit may then manually operate an access device to allow the vehicle to enter/exit the parking facility.

In another embodiment, the system may transmit the permission information directly to an access device. Upon receiving the permission information, the access device may automatically activate to allow the vehicle to enter/exit the parking facility.

Alternatively, the system may be communicatively coupled to a third-party access control system and/or third-party transient parking system. In such embodiment, the system may simply transmit the permission information to the respective third-party system(s) such that the systems may allow the vehicle to enter/exit the parking facility.

It will be appreciated that steps 301 through 315 may be performed by the host processor; by the host processor and any number of input units; and/or by any number of input units, without the host processor. In one embodiment, an input unit receives and/or determines identification information; determines an account corresponding to the identification information; and determines and/or generates the permission information. The input unit may determine that the vehicle/operator is authorized to enter/exit the facility, based on any account information associated with the account and then may generate permission information. The input unit may then transmit the permission information to a user of the input device and/or a separate output device. However, if the input unit determines that the vehicle/operator is not authorized to enter/exit the facility, a notification may be displayed to a user of the input device and/or a separate output device and such user may take appropriate action (e.g., request payment from the operator and/or take any additional steps to authorize the vehicle/operator).

In another embodiment, permission information may be determined and/or generated by the host processor. In this embodiment, the host processor may determine that the vehicle/operator is authorized to enter/exit the facility, based on any account information associated with the account and may generate permission information. The host processor may then transmit the permission information to an input unit, an output unit and/or an access device at step. However, if the host processor determines that the vehicle/operator is not authorized to enter/exit the parking facility, a notification may be transmitted to such device(s) to allow a user to request payment from the operator and/or to take any additional steps to authorize the vehicle/operator.

At optional step 320, the system may update account information associated with the determined account and/or may update parking facility information associated with the parking facility in which the vehicle is entering/exiting. In one embodiment, the system may update the account information to indicate a vehicle status (parked, not parked), activity information (e.g., a time the vehicle entered/exited the parking facility), payment information (e.g., payment received, amount due, etc.) and combinations thereof. Although not shown, the system may return to step 310 to determine permission information based on the updated account information.

In certain embodiments, the system may additionally or alternatively update parking facility information. For example, the system may update a count of parked vehicles at a given time or within a given period and/or a parking ID for each parked vehicle at a given time or within a given period.

At optional step 325, the system may utilize the updated account information and/or updated parking facility information to generate one or more reports about a given account and/or about a given parking facility. For example, the system may generate a report comprising information about a specific account, such as parking facility usage, parking activity, parking status and/or parking history of one or more vehicles associated with an account. As another example, the system may generate a report comprising information relating to parking history, parking activity, parking facility usage, which vehicles are parked in a parking facility, a total number of vehicles parked in the parking facility, entrance and/or exit activity for the facility over a period of time and/or combinations thereof.

It will be appreciated that the system may transmit any updated information and/or generated reports to one or more connected devices and/or systems. For example, the system may transmit such information/reports to one or more output units located at any number of parking facilities and/or remotely from such parking facilities.

It will also be appreciated that the system may be associated with more than one parking facility and may coordinate parking in each associated parking facility, individually or collectively. In collectively coordinating parking for multiple parking facilities, the system may treat the multiple parking facilities as a single parking facility or as associated parking facilities. For example, in treating the multiple parking facilities as single parking facility, the system may allow for multi-location access wherein an operator with an account in one of the multiple parking facilities may park in another of the multiple parking facilities using the same account information. The system may also generate a report of spaces available in each of the multiple parking facilities and transmit the report to output units in each parking facility in order to manage and coordinate parking among the multiple parking facilities.

In another example, in treating the multiple parking facilities as associated parking facilities, the system may enable an operator with an account associated with a first parking facility to park at a discounted rate in a second parking facility. In this example, the system may provide cross billing by, for example, deducting the discounted parking fees associated with parking in the second parking facility from the operator account associated with the first parking facility.

Managing Parked Vehicles

Figure 4:
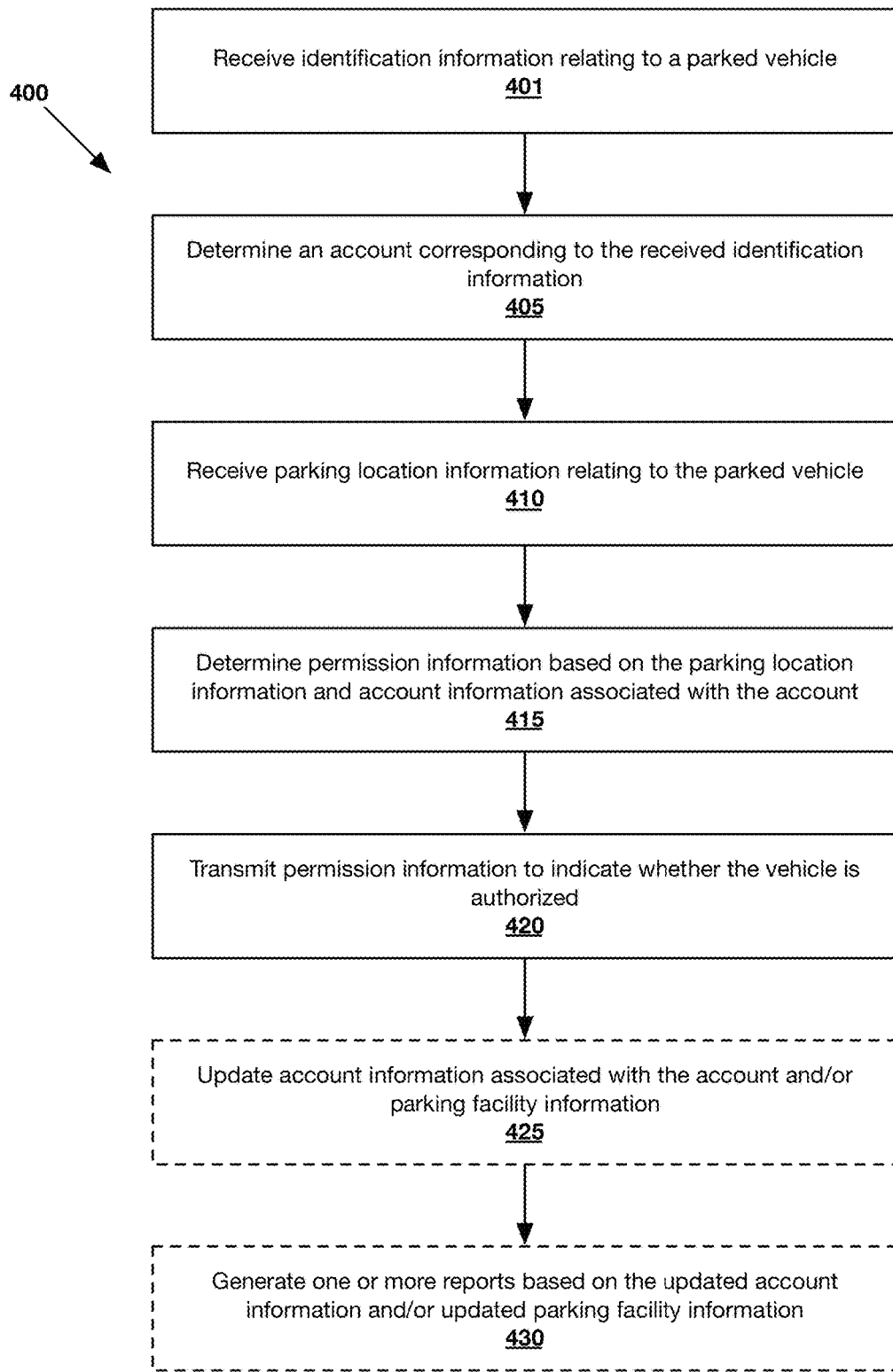
FIG. 4 shows an exemplary method 400 of managing vehicles parked in a parking facility in accordance with some embodiments.

Referring to FIG. 4, an exemplary method 400 of managing parked vehicles in one or more parking facilities according to an embodiment is illustrated. As shown, the method begins at step 401, where one or more input unit(s) may receive and/or determine identification information for a parked vehicle. As discussed above, some or all of the identification information may be manually entered into the system by one or more users (e.g., service providers and/or admin users) and/or may be automatically received via one or more input units.

At step 405, the system may determine an account associated with the parked vehicle based on the identification information. As discussed above, the system may compare the received identification information to stored account information to determine a corresponding account.

At step 410, the system may receive and/or determine parking location information for the parked vehicle. In one embodiment, a user may manually enter the location information (e.g., a parking spot ID) into an input unit. In another embodiment, one or more input units may receive or determine location information by way of included or connected location information transmitters located within a parking facility. For example, location information transmitters may be located at each parking spot within a facility and may transmit a parking spot ID (e.g., via Bluetooth, BLE, NFC, RFID, etc.), which may be scanned or otherwise read by an input unit. In yet another embodiment, input units may comprise one or more location sensors (e.g., Wi-Fi, GPS, LTE, etc.) such that location information may be determined via triangulation or the like for any number of parked vehicles. And, in yet another embodiment, input units may capture images or video throughout a parking facility and image recognition functionality may be employed to determine location information from such images/video.

At step 415, the system may determine permission information based on the account information associated with the account and/or the location information. That is, the system may verify that a parked vehicle is an authorized vehicle and/or that a parked vehicle is authorized to park in a given location (e.g., a particular parking space).

In one embodiment, the system may compare the received location information to parking information associated with the account (e.g., authorized parking locations). For example, if a given account is authorized to park in a parking spot associated with a parking space ID, the system may determine whether the received parking location information matches the stored parking space ID. As another example, if a given account is authorized to park anywhere within a certain parking facility, the system may determine whether the received parking location information is associated with that parking facility. And, as yet another example, if a given account is authorized to park only one vehicle in a parking facility at a time, the system may determine whether the there are any other vehicles associated with the account that are parked in the same parking facility and/or in other parking facilities managed by the system.

In one embodiment, the system may further determine that the vehicle is authorized to park in the parking facility, based on any additional account information associated with the matching account (e.g., payment information and/or authorization information). For example, the system may determine that the operator associated with the account matches one or more required authorization criteria (e.g., based on employment information and/or residence information).

As another example, the system may determine an account type associated with the account. The system may then determine whether the vehicle is parked on a long-term basis or on a short-term basis. If the vehicle is parked on a long-term basis, the system may determine whether the account is active (fully paid up) or delinquent (payment past due). Alternatively, if the vehicle is parked on a transient basis, system may determine whether a fee has been paid to park the vehicle and/or whether the fee paid to park the vehicle is appropriate.

In certain embodiments, the system may generate payment information for each vehicle parked in the parking facility and may store the payment information in the database. In other embodiments, the system may receive such information from a connected third-party parking system.

At step 420, upon determining or receiving permission information, such information may be transmitted to one or more devices and/or systems. In one embodiment, the system may display or otherwise transmit the permission information to an input unit or output unit. For example, if the system determines that the parked vehicle is not an authorized vehicle, permission information may be transmitted to an input/output device, which causes such device to display a notification to a user. Upon viewing the notification, the user may take an appropriate action (e.g., ticket or tow the vehicle, charge an account, send a notification to the operator, etc.).

At optional step 425, the system may update account information associated with the determined account and/or may update parking facility information associated with the parking facility in which the vehicle is parked. In one embodiment, the system may update the account information to indicate a vehicle status (parked, parking location, etc.), activity information (e.g., a time the vehicle was determined to be parked in the parking facility), payment information (e.g., payment received, amount due, etc.) and combinations thereof. Similarly, the system may update parking facility information, such as a count of parked vehicles at a given time or within a given period, a parking ID for each parked vehicle at a given time or within a given period and/or a parking location for each parked vehicle.

At optional step 430, the system may employ the updated account information and/or updated parking facility information to generate one or more reports about a given account and/or parking facility. For example, the system may generate a report of illegally and/or improperly parked vehicles (i.e., unauthorized vehicles that are also parked vehicles and/or authorized vehicles parked in an incorrect location). As another example, the system may generate reports as to parking facility usage, parking activity and history of vehicles associated with corresponding accounts. As yet another example, the system may generate an invoice for a delinquent account.

In certain embodiments, the system may generate a report comprising verification information. Such verification information may include information relating to the total count of parked vehicles in a parking facility at a given time and/or an indication of whether additional vehicles may be parked in the parking facility. The verification information may also include information relating to the total number of vehicles associated with a given account that are parked in the parking facility at a given time (and/or specific vehicles associated with the account).

A parking facility may include a number of reserved parking spaces, including parking spaces that may be assigned to and/or reserved for specific vehicles/operators, parking spaces that may be assigned to and/or reserved for vehicles parked on a long-term basis, and/or parking spaces that may be reserved for vehicles parked on a transient basis. As such, the verification information may further include parking space information.

It will be appreciated that the identification information and location information entered into and/or received by the input units may be transmitted to the host processor for further processing and/or storage. Moreover, such identification information and/or location information may be transmitted from an input unit to host processor on a predefined, periodic basis or immediately after the information is received by the input unit.

It will be further appreciated that the system may manage any number of parking spaces among any number of parking facilities. Accordingly, the host processor may periodically receive identification information and location information from input units in each parking facility, wherein the identification information and location information are associated with vehicles parked in a particular parking facility at a given time or during a given time period.

The system may utilize any of the identification information, location information, corresponding account information and/or parking facility information to generate one or more reports about each of the parking facilities. For example, the host processor may generate a report of spaces available in each of the multiple parking facilities. And the host processor may transmit the report to input and/or output units in each parking facility in order to manage and coordinate parking among the multiple parking facilities.

Managing Short-Term Parking

Figure 5:
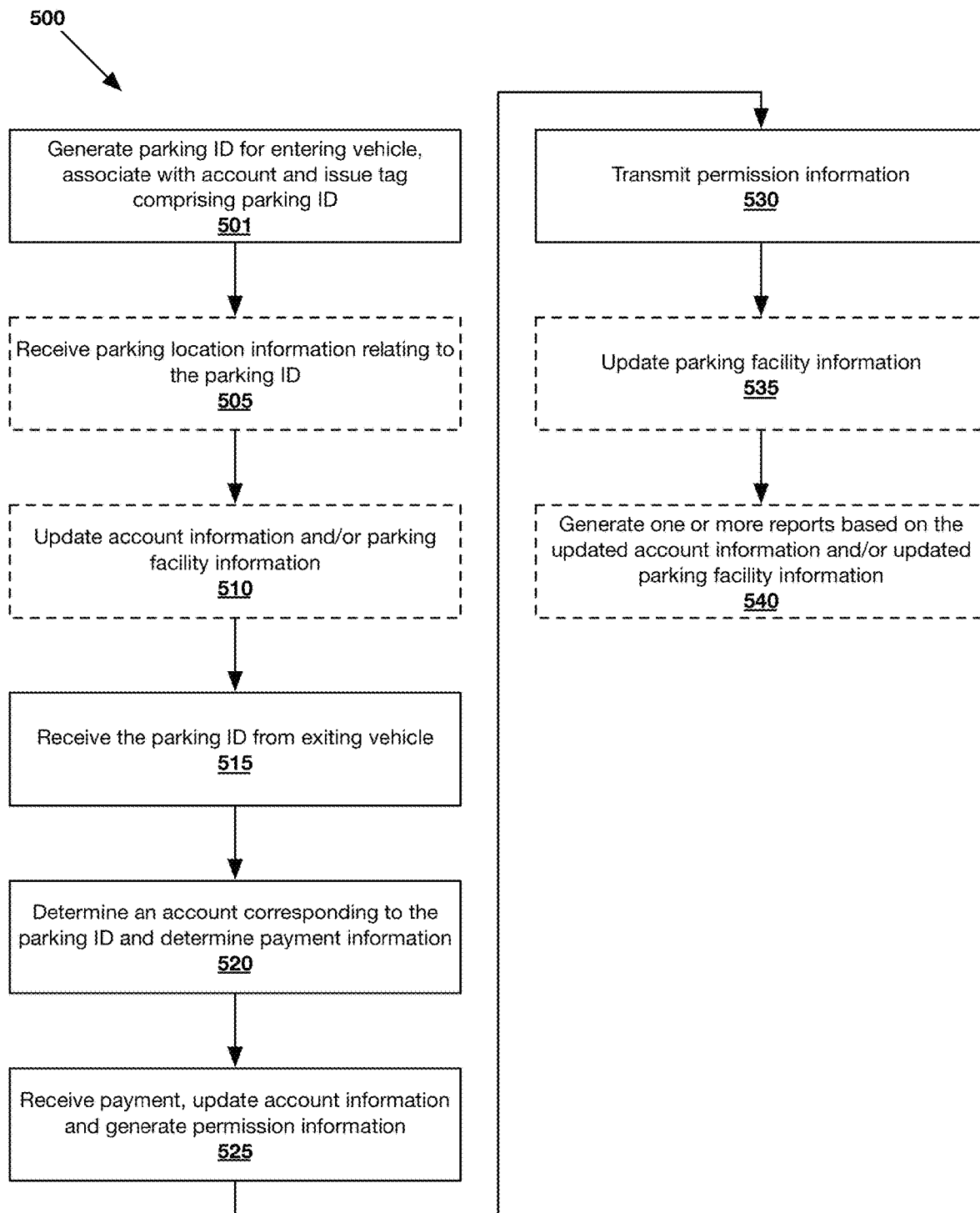
FIG. 5 shows an exemplary method 500 of managing short-term parking in accordance with some embodiments.

Referring to FIG. 5, an exemplary method 500 of managing short-term or transient parking according to an embodiment is illustrated. At step 501, the system generates a parking ID for a vehicle attempting to enter a parking facility on a short-term basis. As discussed above, the parking ID may be generated by an input unit and/or by a host processor and such parking ID may be associated with an account stored in a database. Upon generating the parking ID, the system may create a parking tag comprising or displaying the parking ID, and such tag may be provided to an operator of the entering vehicle.

In one particular embodiment, an input unit (e.g., a mobile phone or a wearable device such as a smartwatch) may include a transceiver that is adapted to transmit the parking ID to a parking tag. In such embodiment, the parking tag may comprise a complementary transceiver and a memory, such that the parking ID may be received from the input unit and stored on the memory of the tag. Alternatively, the parking tag may comprise a software application running on a mobile device. Additionally or alternatively, the parking tag may comprise a display adapted to display the received parking ID and, optionally, any other account information. In any event, the created parking tag may, thereafter, transmit the parking ID to the input unit or other input units.

In short-term parking scenarios, parking fees may be based on an amount of time that a vehicle is parked within a parking facility. Accordingly, the system may determine a start time corresponding to the time that the vehicle enters the parking facility and may associate the start time with the account in the database. Additionally, the system may receive or determine any vehicle information, operator information and/or payment information, and such information may be associated with the account and stored in the database.

Once the required/desired information is received, the vehicle may be permitted to enter the parking facility. In one embodiment, the system may transmit permission information to an access device upon generating a new parking ID/account. In other embodiments, an access device may be manually operated by an admin user or a service provider.

In certain embodiments, the system may periodically receive location information relating to vehicles parked in the parking facility at a given time or during a given time period. In such embodiments, one or more input devices may be employed to determine and/or receive location information and identification information at step 505. As detailed above, received identification information (e.g., a parking ID received by scanning a parking tag or license plate) may be matched to account information associated with an account. Moreover, received location information (e.g., a parking space ID or geolocation) may also be compared to authorized parking information associated with the account.

Accordingly, at step 510, the system may utilize such information to update the account information and/or to update parking facility information. As discussed above, the identification information and location information received from the input units may be employed to maintain and/or update records relating to accounts associated with parked vehicles, to verify the status of such accounts, and/or to verify that each parked vehicle is an authorized vehicle. Such information may additionally or alternatively be employed to determine parking facility information relating to usage or occupancy of parking spaces, parking activity and/or parking history.

At step 515, when a vehicle parked on a short-term basis attempts to exit a parking facility, an input unit retrieves identification information from the vehicle. For example, an input unit may scan the parking tag provided to the operator of the vehicle to determine the corresponding parking ID.

At step 520, the system uses the parking ID (or other identification information) to determine an account associated with the exiting vehicle. That is, the system matches the parking ID to a parking ID associated with an account stored in the system. The system may then determine a fee to charge the operator for parking the vehicle in the parking facility.

In certain embodiments, the parking fee may be determined based on the amount of time that the vehicle was parked in the parking facility. To that end, the system may determine an end time corresponding to the time that the vehicle attempts to exit the parking facility. Such end time may be associated with the account, stored in the database, and compared to the start time to calculate the parking fee.

In other embodiments, the parking fee may not be based on time and a start/end time may not be determined or may not be employed to determine the parking fee.

At step 525, upon determining the parking fee, such information may be transmitted to an output unit such that it may be viewed by the operator of the exiting vehicle and payment may be received (e.g., via an input unit). Alternatively, such fee may be automatically charged to a payment method, if such payment method is stored in the system and the operator has previously provided authorization to do so. In any event, the system may receive payment, update the account information to reflect such payment and generate permission information based on the received payment.

In one particular embodiment, the payment may be determined, displayed and/or received by an input/output unit that comprises a self-service kiosk. Such kiosk may be adapted to receive a customer payment via a wireless connection (e.g., Bluetooth, BLE, NFC, Apple Pay, Google Pay, etc.). For example, when an operator is located within a certain distance of the kiosk, the operator may automatically receive a notification that includes the fee information and a request for payment. The operator may then pay the fee by accepting the notification and wirelessly transmitting the payment to the kiosk.

At step 530, the system transmits the permission information to an output unit and/or an access device that may be activated based on the permission information. Upon activation of the access device, the vehicle may be permitted to exit the parking facility.

At optional step 535 the system may update the parking facility information to reflect that the vehicle has exited the parking facility. And, at optional step 540, the system may generate one or more reports comprising the updated account information and/or updated parking facility information. As discussed above, the system may transmit such reports to any number of output units located in the parking facility, a different parking facility managed by the system and/or to an output unit that is not located in any parking facility.

Services Management

Figure 6:
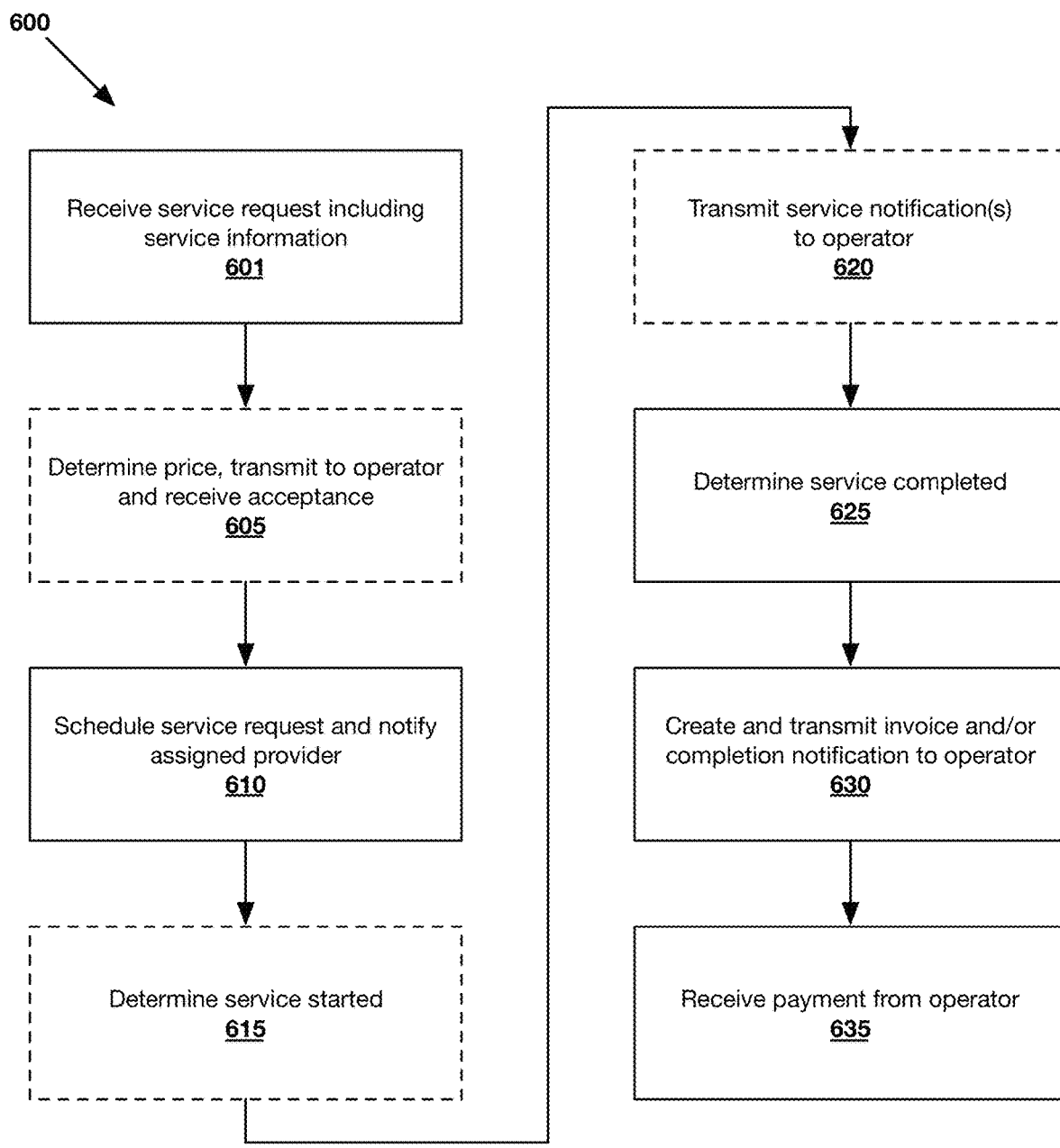
FIG. 6 shows an exemplary method 600 of managing parking services associated with a parking facility in accordance with some embodiments.

Referring to FIG. 6, an exemplary method 600 of managing parking facility services in accordance with an embodiment is illustrated. Many parking facilities have a limited supply of parking spaces available for a high volume of vehicles that must be parked. Thus, there is a concern for the availability of an operator's vehicle when the operator enters and/or departs the facility. The operator would like to have access to the parking facility and would also like to have access to their vehicle available and ready when they are planning on leaving the facility. To best expedite the operator's demand for both entering (ingress) and exiting (egress) the facility, the system may expedite the availability of the vehicle entrance and the prompt delivery of the vehicle to the operator in order to exit the facility. The operator's demand for their vehicle may be displayed to attendants and/or supervisors at the facility (e.g., via a call board or other system), which allows such employees to take appropriate action to facilitate operator ingress or egress.

At step 601, a service request comprising service information is received. Service requests may be received from a vehicle operator (e.g., via a customer application) and/or may be manually entered into the system by a service provider or admin user (e.g., via a service provider application). Service information may include, but is not limited to, available service types, service requirements, service status (e.g., requested, scheduled, canceled, completed, etc.), service price, and/or service location. In some embodiments, service information may additionally or alternatively comprise operator information, vehicle information, service provider information, an estimated time required to complete the service, a start time, an end time, notes and/or comments.

At step 605, the system may process the service request and may transmit the service information to an input unit or output unit in the requested parking facility. In embodiments where the service request includes service notes, the system may employ natural language processing to determine additional service information and, optionally, to determine a price based on such information.

At step 610, a service is scheduled for the service request. Generally, the system may display scheduled service information to a service provider (e.g., via an output device and/or via a user device running a service provider application). For example, the system may transmit the scheduled service to a services list in the application along with a notification.

In one embodiment, a service may be manually scheduled by a user, such as a service provider and/or an admin user. For example, an admin user may assign a service request to one of a number of service providers. As another example, a service provider may assign the service request to himself.

In other embodiments, received service requests may be automatically assigned to a service provider. Such scheduling may be determined for a single service provider or for multiple service providers, and may be determined for a single request or for multiple requests spanning any amount of time (e.g., a single work day or multiple work days). It will be appreciated that, although the system may automatically assign services to service providers, the system may allow a user to add/remove services to/from a service provider and/or move services between providers as desired or required.

In order to automatically schedule a service, the system may consider a number of variables, such as: service information, operator information, vehicle information, parking location information, service provider information and/or financial information (e.g., price for service and/or cost to perform service). In one embodiment, the system may provide an optimized service order based on the location of parked vehicles and/or the estimated time required to complete each requested service.

Additionally or alternatively, if conditions change (e.g., service provider is not available, service additions, service completion time changes, etc.), the system may automatically make adjustments to a provider's service order and such changes may be pushed to an output unit and/or to the service provider application.

At optional steps 615 and 620, the system determines the service is in progress and sends one or more service notifications to the vehicle operator. In one embodiment, the system may automatically detect that a service is being performed and may record information related thereto, such as service start time, service end time and service duration. Such information may be determined without any input from the service provider.

In another embodiment, the system may automatically detect such variables, but may ask the service provider to confirm that he has started to perform the service. In yet another embodiment, the service provider may be required to enter such information and/or may be required to confirm that a service is in progress, with or without a prompt from the system.

At step 625, the system determines the service has been completed. The system may determine completion of a service when information is received from an input unit. For example, a service provider may indicate that a service has been completed by inputting information into a service provider application. In another embodiment, one or more input units may record a service provider and an admin user may view such recordings and indicate when the service has been completed. In yet another embodiment, a vehicle operator may indicate that the service has been completed.

At step 630, upon successful completion of the service, a final price may be calculated (optional) and the vehicle operator may be billed for the service. Moreover, service status notifications may be transmitted to users of the service provider application and/or customer application (e.g., push notifications, emails, SMS, and/or calls). Such notifications may include, for example, a notice of completion of the service, including any service details determined by the system or entered via the service provider application, an invoice and/or receipt for the service, a request for feedback, billing information and/or past order details, and/or reorder options.

In one embodiment, the system may create and/or transmit one or more reports to users. A report may include detailed service information relating to any service performed, such as but not limited to: service provider information, vehicle images, notes relating to service performed, and/or relevant vehicle location history (e.g., parking location where service was performed).

At step 635, payment is received from the customer. The system (and/or connected third-party systems) may be configured to accept payment for invoices via electronic payments, credit cards, wire transfers and/or any physical means. Moreover, such systems may be configured to send notifications and/or communications (e.g., push, email, SMS, mail, and/or calls) relating to invoices (e.g., overdue invoice notifications and/or payment received notifications).

Service Provider Application

In certain embodiments, a service provider application may be provided to allow users (e.g., service providers and/or admin users) to view, create, update and/or delete information relating to services, service providers, accounts, vehicles, operators and/or payments. The service provider application may be installed on (or accessed by) one or more client devices. For example, the application may be in the form of a native desktop or mobile application and/or a web application. The service provider application may communicate with the host processor via a network.

Generally, the service provider application allows users to manage parking facility access, parking facility services and/or service provider schedules. A service provider user may utilize the application to review parking facility information, review service requests, assign service requests to service providers, and/or to track services.

Admin users may also login to, and use, the application. Such admin users may administer, update, query, and/or output information stored in the system, such as to view, schedule, manage and/or track vehicle parking and/or services schedules. Admin users may also use the system to monitor authorized and parked vehicles for a given parking facility.

Figure 7:
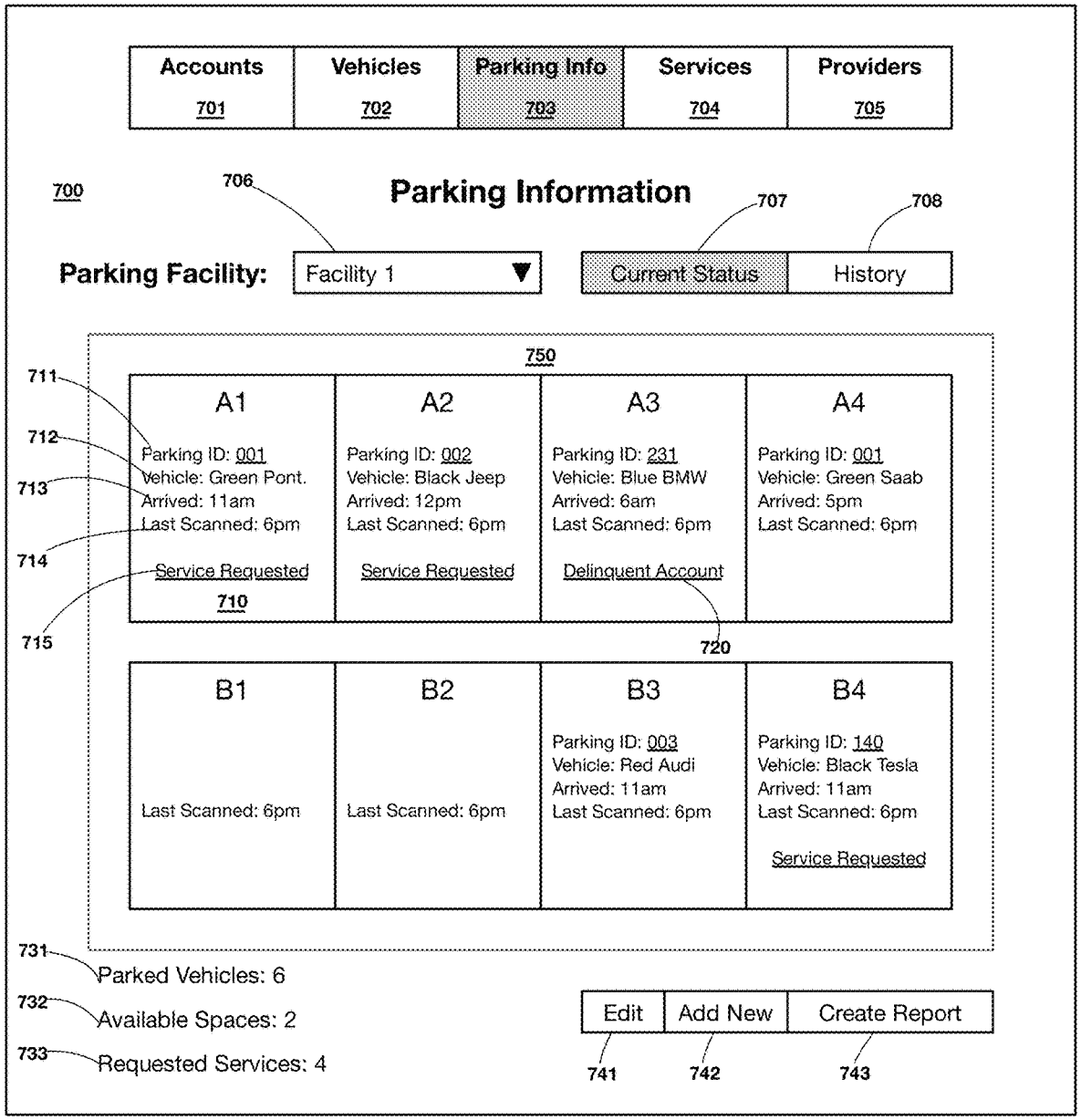
FIG. 7 shows an exemplary parking information screen 700 of a service provider application in accordance with some embodiments.

Referring to FIG. 7, an exemplary parking information screen 700 of a service provider application is illustrated. As shown, the interface may comprise a menu including links to various user interface screens. In one embodiment, the menu may include links to a parking information page 703 (shown in FIG. 7) and a services management page 704 (show in FIG. 8), and/or.

The menu may include a link to an accounts page 701, which may display a list of accounts stored in the system along with corresponding account information and/or operator information. In certain embodiments, displayed account information may include, but is not limited to: operator name; operator contact information (e.g., mailing address, phone number, fax number and/or email address); operator billing information (billing address, credit card information, billing phone number, etc.); account status (active, inactive, new, priority); a contact associated with the account (e.g., a salesperson or account manager); service information; and/or documents associated with an account (e.g., reports generated for and/or about the account).

The menu may also include a link to a vehicles page 702, which may display a list of vehicles stored in the system along with corresponding vehicle information. In one embodiment, the displayed vehicle information may include, but is not limited to: a vehicle ID; vehicle type information (e.g., make, model, year, color); a vehicle status; vehicle activity information and/or a vehicle location.

The menu may further include a link to a service providers page 705, which may display a list of service providers information stored in the system along with corresponding service provider information. In one embodiment, the displayed service provider information may include, but is not limited to: a name, address, phone number, email address, working hours, salary information, services provided and/or notification settings. Additionally or alternatively, the application may provide a list-view or map-view showing current and/or historical location information for each of the service providers. For example, the application may display a current location of each on-duty service provider in real time or near-real time. As another example, the application may display each service provider's daily schedule and/or schedules for previous days.

As shown in FIG. 7, the parking information screen 700 may display a list-view or map-view 750 showing current 707 and/or historical 708 location information for vehicles parked in a given parking facility 706. For example, the application may display a map of a selected parking facility 750, wherein the map includes parking spaces 710 and vehicle information associated with vehicles parked in such parking spaces (if any). It will be appreciated that the system may manage any number of parking facilities, and the service provider application may display parking facility information for any of such parking facilities.

The parking information screen 700 may display various information for each parking space 710 shown in the map interface 750, such as but not limited to: a parking ID of a parked vehicle 711, vehicle information of a parked vehicle 712 (e.g., color, make, model, year, etc.), a time the parked vehicle entered the parking facility 713, and/or the most-recent time identification information and/or location information was received by the system for the parked vehicle and/or the parking spot 714.

The parking information screen 700 may also display service information and/or account status information relating to parked vehicles. For example, if a service has been requested for a parked vehicle, the screen may display a notification and/or a link 715 (e.g., "Service Requested") such that a user may view the details of the service request by selecting the link. As another example, if an account associated with a parked vehicle is not authorized (e.g., an account is delinquent for non-payment and/or a vehicle associated with the account is parked in an unauthorized location), the system may display a notification and/or a link 720 such that a user may view the details of the account by selecting the link.

In certain embodiments, the parking information screen 700 may display parking facility information for a selected parking facility 706. As shown, the system may display a total number of parked vehicles 731, a number of available spaces 732, and/or a number of requested services 733 associated with parked vehicles. The application may provide an option 743 to allow users to create reports including any parking facility information.

As shown, the system may display an option 741 to allow users to edit the displayed information. Additionally or alternatively, the system may display an option 742 to allow users to add new information that may be displayed via the parking information screen 700.

Although not shown, the application may also display activity information relating to parked vehicles and/or operators associated with parked vehicles. For example, the application may display images of parked vehicles and/or operators associated with parked vehicles. As another example, the application may be adapted to display images or video of such vehicles and/or operators entering and/or exiting the parking facility. The user interfaces may also be employed to track, record and/or display images or video of a person requesting that a vehicle be released from the parking facility.

Referring to FIG. 8, an exemplary services management screen 800 of a service provider application is illustrated. As shown, this screen may present a list of requested services 880 along with corresponding information stored in the system. Generally, service requests may be received directly from vehicle operators (e.g., via a customer application) or from any party that has access to the service provider application (e.g., service providers or admin users). In certain embodiments, the service provider application may allow a user of the application to manually add a new service and/or schedule a new service by selecting a "Create New" option 890.

As shown, each of the requested services 880 may be displayed and filter by, for example, service date 810, service time 815, service type 820, vehicle make/model, and other service information. The application allows a user to view services scheduled for and/or completed on a particular day 807, for one or more parking facilities 806, for one or more operators 845 and/or for one or more vehicles 835. The application may also display a service status 855, which indicates whether a service and/or service request requires action by a user.

In one embodiment, users may query the system in a variety of ways, such as via date and time, vehicle, operator, account and/or service. Such queries may be displayed on one or more output devices, transferred to other systems, and/or printed. As an example, a list of vehicles that are scheduled to depart a parking facility within a specified time period (e.g., between 7 AM and 9 AM the following day) may be determined and displayed.

In response to queries, the system may highlight inappropriate reservations, accounts that do not match, or other anomalies. Moreover, the system may respond to a query by requiring a user to provide additional information (e.g., an identification number or password) before displaying sensitive information.

Although the illustrated embodiment shows certain service information, it will be appreciated that the application may display any service information stored in the system. Accordingly, the services management screen 800 may display some or all of the following service information: service type (e.g., pickup, drop off, cleaning, maintenance, etc.); vehicle information; service scheduling information (e.g., one-time service or recurring service); service date(s) and time(s) (may include start date/time, end date/time, target completion time, and/or estimated completion window); service length (estimated and/or actual time required to perform the service); vehicle and/or service location; operator information; service provider information; service status (e.g., requested, scheduled, in-progress and/or completed); service history information; service creation and/or cancellation date; service creator information (e.g., a user who created the service); priority information; service notes and/or images relating to the service.

As discussed in detail above, the system may store a number of accounts, where each account may be associated with vehicle information, operator information and/or payment information. Accordingly, the service information screen 800 may display account information associated with service requests, such as vehicle make and/or model 825, vehicle color 830, vehicle parking ID 835, vehicle parking location 840, and/or vehicle operator name 845.

In certain embodiments, the application may provide a list of available service providers and/or a list of service providers assigned to each of the service requests 850. In one embodiment, a user may select a service provider to view that provider's information and/or service-related information (e.g., completed services, current services, missed services, etc.).

The system may further display one or more options 865 associated with service requests. Such options may include, for example, an option to assign a service request to a service provider, an option to edit a service request, an option to view history information associated with a service request, an option to view updates associated with a service request and/or an option to notify an operator.

In one embodiment, a service provider may be manually assigned to a service request by, for example, selecting an "Assign" option associated with the service request. It will be appreciated that a service may be automatically assigned to a service provider by the system. As discussed in detail above, the system may determine an appropriate or optimal service provider to fulfill the requested service. The system may schedule the service and provide any desired or required notifications.

The services management screen 800 may show additional information, such as but not limited to: notes 860 from operators, service providers and/or admin users; estimated completion time; and/or a map, street view and/or image of an exact vehicle location. In one embodiment, the services management screen 800 may also display notifications relating to upcoming and/or in-progress services. Such notifications may be displayed to indicate that a scheduled service is close to occurring. In addition, the services management screen 800 may display newly received requests and/or newly scheduled services. In some embodiments, the interface may provide an indication that such requests and/or services are new.

In one embodiment, the services management screen 800 may provide a feature to allow a service provider to speak directly with other users via cellular service, VoIP or two-way radio.

Customer Application

In one embodiment the parking facility management system comprises a vehicle operator application (also referred to as an "operator application" or "customer application") installed on (or accessed by) one or more client devices. The customer application may be in the form of a desktop or mobile app and/or a web app. A user may download the customer application via their mobile device (e.g., Google Play Store or Apple App Store) or may navigate to a web URL using an internet browser. The customer application may communicate with the host processor via a network, such as a cellular network or Wi-Fi network.

Generally, the customer application allows a customer to create, update and/or view information, notifications, confirmations and/or reports relating to their accounts and/or scheduled parking facility services. The customer application may also allow vehicle operators to place requests for services through the application.

Referring to FIG. 9, an exemplary login screen 900 for a customer application is illustrated. As shown, the user may enter login information, such as an account number 905 and/or a password 910, and then select a login option 915 to access the customer application. In one embodiment, the login screen may comprise an option 920 to register for a new account. Additionally, the login screen may comprise an option 925 to reset a forgotten password.

If the login information provided by the user is associated with an account stored in database, the system may access the relevant account information in the database to determine whether the operator is permitted to access a parking facility and/or the services management system. For example, the system may determine that the operator is authorized to access the services management functions by authenticating the login information using the account information stored in database. The system may also determine that the operator is authorized to access the system by, for example, confirming that the payment status of an account associated with the operator is up-to-date, that the operator is accessing a parking facility in a given location, and/or that the operator is entering vehicle information for an authorized vehicle associated with the operator's account.

If the system determines that the operator is authorized, the system may retrieve relevant account information from the database and may display the same to the operator. However, if the system determines that the login information entered by an operator is incorrect, the system may maintain one or more records relating to the operator status, payment, penalty, and/or access. The system may, therefore, include a historical component of usage and transactions at each associated parking facility. In one embodiment, some or all of such information may be displayed to the operator.

Referring to FIG. 10, an exemplary services list screen 1000 for a customer application is illustrated. As shown, the screen 1000 may comprise a menu that includes an option 1003 to view the services list screen and/or an option 1004 to view an account information page.

In one embodiment, the services list screen 1000 displays a list 1001 comprising each of the services requested by a customer and corresponding information. As shown, the list 1001 may be displayed and filter by, for example, vehicle information 1010, parking facility 1020, service time 1030, service type 1040, service status 1050, service fee 1060, service notes 1060 and/or service options 1080.

As shown, the application allows a user to view services scheduled for and/or completed on a particular day, for one or more parking facilities and/or for one or more vehicles. The application may also display a service status 1050, which indicates whether a service and/or service request has been scheduled and/or completed. Although the illustrated embodiment shows specific service information, it will be appreciated that the application may display any service information stored in the system.

As shown, the screen 1000 includes an option to request a new service ("Add New") 1002. Upon selecting this option, a service request screen may be displayed.

Referring to FIG. 11, an exemplary service request screen 1100 for a customer application is illustrated. This screen may allow customers to create and submit parking facility service requests. Generally, a customer enters a service request via the service request screen and the request is transmitted to the parking facility management system for scheduling.

As shown, the service request screen 1100 may display a number of user input fields to allow the user to enter service information. The screen may display a vehicle field 1110 that allows the user to select a vehicle associated with their account. The screen may further display a parking facility field 1120 that allows the user to select a parking facility associated with their account. The selected parking facility corresponds to a facility in which the customer desires a service to be performed.

In one embodiment, the application may display a service type selection field 1130 to allow the user to select and/or enter a type of service to be performed. The application may also display a service time selection field 1140 that allows the user to select an available service time. The service time corresponds to a specific time at which the customer would like the service to be performed and/or a time window during which the service should be performed. The application may further display a service notes field 1150, which may be used by the customer to include any instructions to relay to the service provider.

Upon entering the required/desired service information, the customer may select the "Submit Request" option 1162 to transmit the service request to the system. The request may be transmitted to the parking facility management system where it is processed and eventually assigned to a service provider. Upon successful submission of a service request, a confirmation screen may be displayed to the user. Alternatively, the user may select a cancel option 1161 to cancel the request and return to the services management screen (see FIG. 10 at 1000).

Although not shown, the system may allow the user to create, update and/or delete account information. In one embodiment, the client application may display parking facility information to allow operators to determine where to park their vehicle (i.e., an optimal parking facility). For example, consider that host processor is associated with multiple parking facilities in a metropolitan city. Consider also that, based on the account setup for the operator, the operator may park in any of several parking facilities in a given area. Such operator may login to the customer application and receive a dynamic report of available spaces in each parking facility in the given area, a dynamic graph of traffic flow around parking facilities in the given area and/or other information to enable the operator to select a convenient parking facility.

The client application may also be adapted to provide various notifications. Such notifications may include, but are not limited to, a dynamic report of available spaces in each parking facility in a given area, a dynamic graph of traffic flow around parking spaces in the given area and/or other information associated with the relevant parking facilities. The operator may use the notification information to reserve or select a convenient parking facility and/or parking spot within such facility.

In one embodiment, the client application may be adapted to display a parking ID such that it may be read by a service provider associated with a parking facility. In other embodiments, the client application may be adapted to transmit a parking ID such that it may be received by an input unit associated with a parking facility. And in yet other embodiments, the client application may be adapted to allow an operator to print a parking ID tag and/or a replacement parking ID tag (e.g., for use on a substitute vehicle).

As discussed above, the system may be associated with more than one parking facility and may coordinate services in each associated parking facility, individually or collectively. In collectively coordinating services for multiple parking facilities, the system may treat the multiple parking facilities as a single parking facility or as associated parking facilities. For example, in treating the multiple parking facilities as single parking facility, system may allow for an operator with an account in one of the multiple parking facilities to request and receive services in another of the multiple parking facilities using the same account information. The system may also track and report on service availability and/or service status in each of the multiple parking facilities and transmit such reports to output units in each parking facility in order to manage and coordinate services among the multiple parking facilities.

Consider, for example, that a registered operator has a reserved space in a first parking facility. Using the system, the operator may temporarily reserve a space in a second parking facility. The operator may park the vehicle in a reserved space in the second parking facility free of charge because the operator has a current account with the first parking facility or the reserved space may be used at a discounted rate. The system may transmit service information associated with a requested service to host processor and host processor may transmit the service information and/or permission information to an input unit and/or output unit in the second parking facility. In another example, host processor may transmit the service information and/or permission information to the operator (e.g., an application running on an operator device) and the operator may use the service information and/or permission information to enter the second parking facility.

In addition to the parking services described above, the system may be adapted to receive requests and/or schedule other types of services. For example, the system may be used for reserving and scheduling events such as medical visits, sales calls, and/or pre-planned meetings. The system may also be used for reserving and scheduling operational events where people or equipment have to be procured to a specific location at specific times. The disclosed embodiments provide access to system that can be a standalone system or that may work in conjunction with a central system or independent remote devices.

Figure 12:
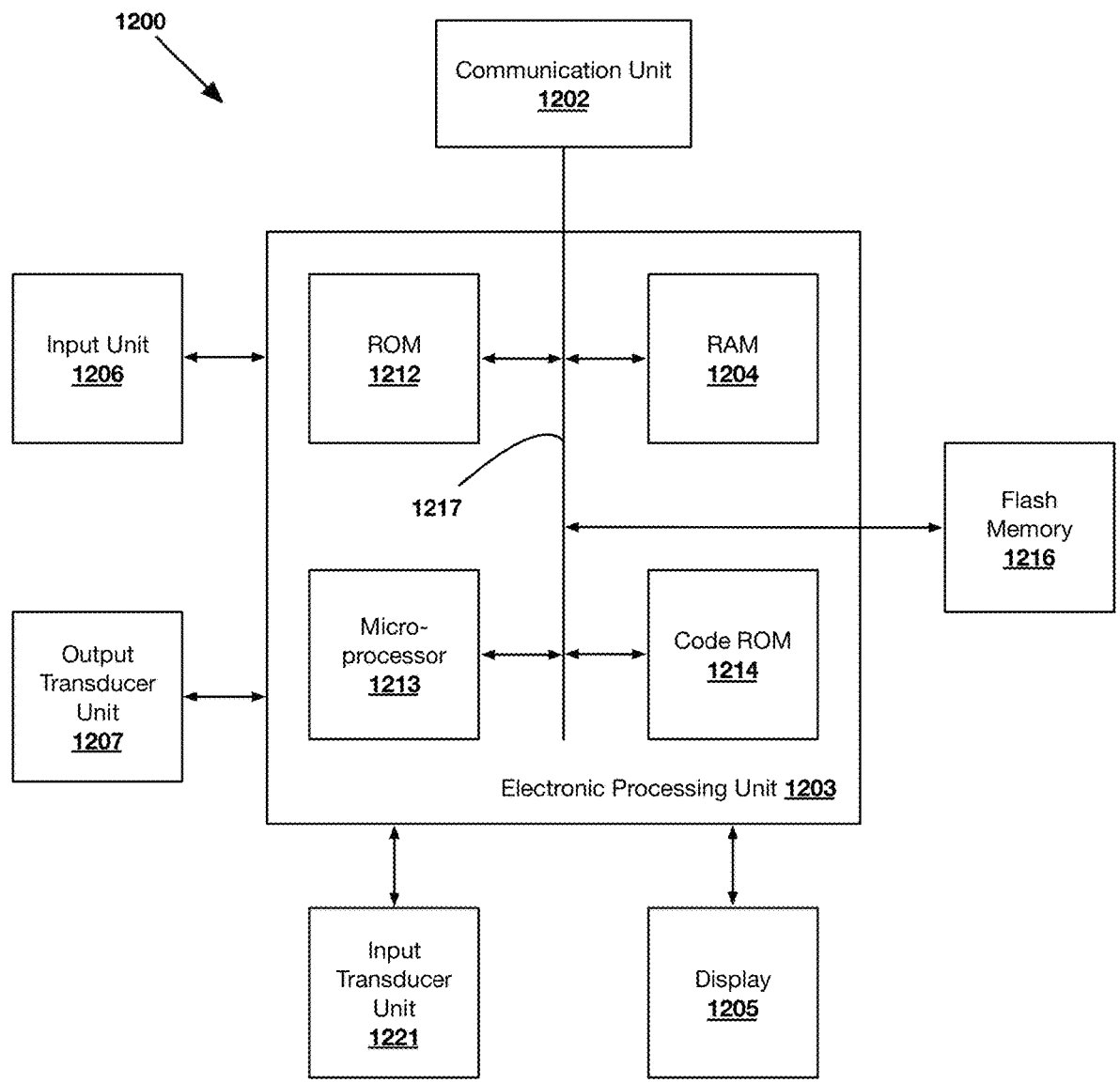
FIG. 12 shows an exemplary host processor 1200 used in accordance with some embodiments.

Referring to FIG. 12 an exemplary host processor used in accordance with some embodiments is illustrated. As shown, the host processor 1200 may include a communications unit 1202 coupled to a common data and address bus 1217 of an electronic processing unit/processor 1203. Host processor 1200 may also include an input unit 1206 (e.g., touch screen device, keypad, keyboard pointing device, scanner, RFID reader, etc.), an output transducer unit 1207 (e.g., a display, a speaker), an input transducer unit 1221 (e.g., a microphone) and a display screen 1205, each in communication with the electronic processing unit 1203.

The electronic processing unit 1203 may include a code read-only memory (ROM) 1212 for storing data for initializing system components of the communication device. The electronic processing unit 1203 may further include a microprocessor 1213 coupled, by a common data and address bus 1217, to one or more memory devices, such as a read only memory (ROM) 1214, a random access memory (RAM) 1204, and/or a static memory or flash memory 1216. One or more of ROM 1214, RAM 1204 and flash memory 1216 may be included as part of electronic processing unit 1203 or may be separate from, and coupled to, the electronic processing unit 1203.

Communications unit 1202 may include an interface configurable to communicate with network components and other user equipment, input units and output units within its communication range. Communications unit 1202 may also include one or more local area network or personal area network transceivers perhaps operating in accordance with an IEEE 802.11 standard (e.g., 802.11a/b/g/n) and/or a Bluetooth transceiver. The one or more memory devices 1212, 1214 and 1216 are configured to store non-transitory computer-executable instructions to perform a set of functions such as set forth in FIGS. 2-6.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random-access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method comprising:
   storing, by a host processor, in one or more databases, account information associated with each of a plurality of accounts, the account information comprising:
      vehicle information relating to one or more vehicles; and
      authorization information;
   receiving, by the host processor, from a first input unit, first identification information relating to a first vehicle parked in a location associated with a first parking facility;
   determining, by the host processor, an account associated with the first vehicle from the plurality of accounts, based on the received first identification information and the vehicle information associated with the determined account;
   determining, by the host processor, that the first vehicle is authorized to park in the first parking facility, based on the authorization information associated with the determined account;
   transmitting, by the host processor, first permission information to a user device to thereby indicate that the first vehicle is authorized to park in the location;
   updating the account information associated with the determined account to indicate that the first vehicle is parked in the first parking facility;
   receiving, by the host processor, from a second input unit, second identification information relating to a second vehicle attempting to enter a second parking facility;
   determining, by the host processor, that the second vehicle is associated with the determined account, based on the received second identification information and the vehicle information associated with the determined account;
   determining, by the host processor, whether the second vehicle is authorized to enter the second parking facility, based on the updated account information associated with the determined account; and
   transmitting, by the host processor, second permission information to the user device or a different user device to thereby indicate whether the second vehicle is authorized to enter the second parking facility.

2. The method of claim 1, wherein:
   the first identification information comprises a parking ID; and
   the parking ID is received from a parking tag associated with the first vehicle,
      wherein the parking tag comprises a label, a decal, a sticker, a permit, a card, a license plate or an electronic device; and
   the parking ID is received by the first input unit, from the parking tag, via one or more of the group consisting of: radio frequency identification ("RFID"), near-field communication ("NFC"), Bluetooth, Bluetooth Low Energy ("BLE"), Wi-Fi, a barcode, a digital display, image capture, and a magnetic strip.

3. The method of claim 1, wherein the first identification information comprises one or more of the group consisting of: a make of the first vehicle, a model of the first vehicle, a color of the first vehicle, a license plate number of the first vehicle, and operator information associated with an operator of the first vehicle.

4. The method of claim 1, wherein the vehicle information and/or the authorization information is received by the host processor from a third-party system.

5. The method of claim 1, wherein the first input unit is selected from the group consisting of: a fixed input unit, a hand-held input unit, and an input unit attached to a mobile vehicle.

6. The method of claim 1, wherein:
   the first identification information is received by the first input unit at a first time,
      wherein the first input unit is not in communication with the host processor at the first time; and
   the first identification information is received by the host processor, from the first input unit, at a second time, wherein the first input unit is in communication with the host processor at the second time.

7. The method of claim 1, wherein the authorization information comprises one or more of the group consisting of: authorized parking location information, authorized parking times, payment information, and authorized operator information.

8. The method of claim 7, wherein:
   the authorization information comprises authorized parking location information;
   the host processor receives location information relating to the location where the first vehicle is parked from the first input unit or a different input unit;
   the host processor determines that the first vehicle is authorized to park in the location, based on the received location information and the authorized parking location information associated with the determined account; and
   the determining that the first vehicle is authorized to park in the first parking facility is further based on the determination that the first vehicle is authorized to park in the location.

9. The method of claim 8, wherein:
   the location information comprises a parking space ID associated with the location; and
   the parking space ID is received by the first input unit or the different input unit via one or more of the group consisting of: radio frequency identification ("RFID"), near-field communication ("NFC"), Bluetooth, Bluetooth Low Energy ("BLE"), Wi-Fi, a barcode, a digital display, image capture, and a magnetic strip.

10. The method of claim 8, wherein the location information is determined by the first input unit or a different input unit via triangulation or image recognition.

11. The method of claim 7, wherein:
   the authorization information comprises payment information; and
   the determining that the first vehicle is authorized to park in the first parking facility is further based on the payment information.

12. The method of claim 7, wherein:
   the authorization information comprises authorized operator information;

the host processor receives operator information relating to an operator of the first vehicle from the first input unit or a different input unit; and the determining that the first vehicle is authorized to park in the first parking facility is further based on the received operator information and the authorized operator information associated with the determined account.

13. The method of claim 12, wherein the authorized operator information associated with the determined account comprises operator identification information and one or more of the group consisting of: a security clearance associated with the operator, employment information associated with the operator and residence information associated with the operator.

14. The method of claim 1, further comprising:

generating, by the host processor, a report for the first parking facility, the report comprising one or more of: a total count of vehicles parked in the first parking facility, an account associated with each of the vehicles parked in the first parking facility, a location associated with each of the vehicles parked in the first parking facility, an operator associated with each of the vehicles parked in the first parking facility, and historical information relating to vehicles that were previously parked in the first parking facility; and transmitting, by the host processor, the report to the user device.

15. The method of claim 14, wherein the report further comprises a graphical representation of a map and/or information relating to traffic flow around the first parking facility.

16. The method of claim 14, further comprising:

receiving, from a camera, an image of the first vehicle, wherein the report further comprises the image and at least some of the vehicle information associated with the determined account.

17. The method of claim 1, further comprising scheduling, by the host processor, a service to be performed for the first vehicle, while the first vehicle is parked in the location.

18. The method of claim 1, further comprising:

receiving, by the host processor, third identification information relating to a third vehicle parked in the first parking facility;

determining, by the host processor, a second account associated with the third vehicle from the plurality of accounts, based on the received third identification information and the vehicle information associated with the second account;

determining, by the host processor, that the third vehicle is not authorized to park in the first parking facility, based on the authorization information associated with the second account; and transmitting, by the host processor, third permission information to the user device or a different user device to thereby indicate that the third vehicle is not authorized to park in the first parking facility.

19. The method of claim 18, further comprising one or more of the group consisting of:

transmitting, by the host processor, the third permission information to an access device located at the first parking facility to thereby cause the access device to prevent the third vehicle from exiting the first parking facility; and generating, by the host processor, a request for payment and associating the request with the second account.

* * * * *